(12) United States Patent
Simons

(10) Patent No.: US 9,538,723 B2
(45) Date of Patent: Jan. 10, 2017

(54) ANIMAL RESTRAINT SYSTEM WITH ADJUSTABLE TETHER

(71) Applicant: The Pet Salon, Inc., Margate, NJ (US)

(72) Inventor: Charles Ross Simons, Margate, NJ (US)

(73) Assignee: THE PET SALON, INC.

( * ) Notice: Subject to any disclaimer, the term of this patent is extended or adjusted under 35 U.S.C. 154(b) by 140 days.

(21) Appl. No.: 14/274,995

(22) Filed: May 12, 2014

(65) Prior Publication Data

US 2015/0320012 A1    Nov. 12, 2015

(51) Int. Cl.
| | | |
|---|---|---|
| *A01K 27/00* | (2006.01) | |
| *A01K 1/06* | (2006.01) | |
| *A01K 13/00* | (2006.01) | |

(52) U.S. Cl.
CPC .............. *A01K 1/06* (2013.01); *A01K 1/0613* (2013.01); *A01K 13/00* (2013.01); *A01K 27/003* (2013.01)

(58) Field of Classification Search
CPC ........................................................ A01K 1/04
USPC ......... 119/856, 753, 755–757, 863, 795, 797
See application file for complete search history.

(56) References Cited

U.S. PATENT DOCUMENTS

| | | |
|---|---|---|
| 255,574 A | 3/1882 | Bonelli |
| 1,316,136 A | 9/1919 | Kennedy |
| 1,405,632 A | 2/1922 | Sladky |
| 2,132,556 A | 10/1936 | Blackshaw |
| 2,438,979 A | 4/1948 | Short |
| 2,902,976 A | 9/1959 | Wilson |
| 2,909,154 A | 10/1959 | Thomas |
| 3,120,836 A | 2/1964 | Brauning |
| 3,208,432 A | 9/1965 | Fisk |
| 3,266,464 A * | 8/1966 | Davis ..................... A01K 13/00 119/756 |
| 3,458,188 A | 7/1969 | Infante |
| 4,186,690 A | 2/1980 | Seiler |
| 4,261,296 A | 4/1981 | Rosenberg |
| RE32,052 E | 12/1985 | Rosenberg et al. |
| 4,570,577 A | 2/1986 | Bellinger |
| 4,828,210 A * | 5/1989 | Anderson ................ A01K 1/04 119/797 |
| 5,005,527 A | 4/1991 | Hatfield |
| 5,167,203 A | 12/1992 | Scott et al. |
| 5,269,260 A | 12/1993 | Farrell et al. |
| 5,433,288 A | 7/1995 | James |

(Continued)

OTHER PUBLICATIONS

Corresponding International Search Report and Written Opinion for PCT/US2015/029581 dated Aug. 4, 2015.

*Primary Examiner* — Kristen C Hayes
(74) *Attorney, Agent, or Firm* — The Belles Group, P.C.

(57) ABSTRACT

An animal restraint system includes an arm clamp having a clamp body, a tether, a tether clamp, and a tether connector. The clamp body affixes to a securing arm at or below the animal's head and includes a tether anchor and a tether guide. The tether has a first tether end coupled to the tether anchor, a second tether end, and a middle section forming a loop, with a first loop side extending from the first tether end and a second loop side extending from the second tether end through the tether guide. The tether anchor and the tether guide are positioned to maintain substantial alignment between the first and second loop sides when the loop is tensioned. The tether clamp divides the loop into a primary and secondary loops and maintains a size of the primary loop, and the tether connector is slidably coupled to the primary loop.

12 Claims, 6 Drawing Sheets

(56) References Cited

U.S. PATENT DOCUMENTS

| | | | |
|---|---|---|---|
| 5,732,660 A | 3/1998 | David et al. | |
| 5,749,325 A | 5/1998 | Albanese | |
| 5,806,467 A * | 9/1998 | Arakawa | A01K 27/003 |
| | | | 119/771 |
| 5,866,909 A | 2/1999 | Freeman | |
| 6,192,835 B1 | 2/2001 | Calhoun et al. | |
| 6,244,611 B1 | 6/2001 | Davis | |
| 6,382,139 B1 | 5/2002 | Rhodes | |
| 6,490,999 B1 | 12/2002 | Boys | |
| 6,516,753 B1 | 2/2003 | Taylor | |
| 6,675,742 B1 | 1/2004 | Shiraki | |
| 7,243,825 B2 | 7/2007 | Weisenfeld | |
| 8,267,050 B1 * | 9/2012 | Hatcher | 119/795 |
| 8,365,685 B2 * | 2/2013 | Simons | A01K 1/0613 |
| | | | 119/756 |
| 8,505,495 B2 * | 8/2013 | Wang | A01K 27/003 |
| | | | 119/797 |
| 2009/0071418 A1 * | 3/2009 | Simons | A01K 1/0613 |
| | | | 119/793 |

\* cited by examiner

ANIMAL RESTRAINT SYSTEM WITH ADJUSTABLE TETHER

FIELD OF THE INVENTION

The field of the present invention relates to animal restraint systems, particularly restraint systems that may be used by pet groomers and other pet or animal handlers.

BACKGROUND OF THE INVENTION

Grooming loops have long been used by groomers to position and/or restrain animals, particularly dogs and cats, on a grooming table or platform while the animal is being groomed. The loop is typically connected to an eye-bolt hanging from the upper end of an L-shaped grooming arm, often by a swivel snap closure mechanism that engages the eye-bolt. In earlier versions of the grooming loop, the loop was simply placed over the animal's head to rest around its neck. With the animal's movement limited or restricted by the loop, the groomer would then cut and comb fur, remove fur from the body, paws, face, and head, pare toenails, dry and do all the procedures for proper grooming of the particular breed being groomed.

Restraint devices similar to groomers' loops have been used by animal handlers other than groomers, such as veterinarians who restrain animals during examination and minor surgery. Such restraint devices are often groomers' loops adapted by or for the animal handler to suit the needs of the particular circumstances.

Advances over the basic groomer's loop have been made to provide the animal handler with greater control over the animal and to increase the comfort level of the restrained animal, thereby reducing the incidence of handlers being bitten and injuries to the animals themselves. By way of example, U.S. Pat. No. 4,828,210, the disclosure of which is incorporated herein by reference in its entirety, describes an adjustable lock device suitable for being clamped at one end to the vertical portion of a grooming arm. The other end can be attached by a snap closure mechanism to a training aid combination collar and muzzle. This type of solution does not work well since the animal is left with substantial freedom to move, and the more an improperly restrained animal feels free to move around, the greater the likelihood of injury to either the animal or the handler. Moreover, the limitations imposed by attachment to the vertical portion of the grooming arm and the muzzle tend to make the animal less accessible during grooming. In addition, when the animal is muzzled, its mouth area and some parts of the face cannot be groomed.

U.S. Pat. No. 8,365,685, the disclosure of which is incorporated herein by reference in its entirety, describes an animal restraint system in which the animal is cross tied between a low point, at, below, or above the animal's head, and a high point above the animal's head. The low point may be an adjustable lock device secured to the vertical portion of the grooming arm, and the high point may be, for example, an eye bolt on the upper horizontal portion of the grooming arm. The animal restraint system incorporates a groomer's loop which includes a quick release buckle in-line with the loop and a clamp for adjusting the size of the loop about an animal's neck. This combination of features for the loop is advantageous because it is a fully adjustable system to define the animal's range of movement, thereby providing a comfortable fit for the animal and accommodating a wide range of animal sizes.

One of the deficiencies with the combination of the groomer's loop and the adjustable lock device is the complexity, primarily from a manufacturing point of view, of the adjustable lock device. This complexity results in a higher than desired cost to groomers and other users of the adjustable lock device. Therefore, a need exists for a simplified, and less complex, adjustable lock device.

SUMMARY OF THE INVENTION

The present invention is directed toward a system for restraining an animal, the system enabling the handling of animals with increased simplicity. In the system, the animal may be quickly and efficiently restrained, and regardless of size, the animal can be secured comfortably, thereby increasing safety to both the animal and the handler.

In a first aspect of the present invention, an animal restraint system includes first and second securing arms, a restraint, and an arm clamp. The restraint has a first restraint connector and a second restraint connector, and the first securing arm is configured to couple to the first restraint connector above an animal's head. The arm clamp includes a clamp body, a tether, a tether clamp, and a tether connector. The clamp body is configured to affix to the second securing arm at, below, or above the animal's head, and the clamp body includes a tether anchor and a tether guide. The tether has a first tether end coupled to the tether anchor, a second tether end, and a middle section forming a loop having a first loop side extending from the first tether end and a second loop side extending from the second tether end through the tether guide. The tether anchor and the tether guide are positioned to maintain substantial alignment between the first loop side and the second loop side when the loop is tensioned. The tether clamp is slidably disposed over the first and second loop sides of the tether. The tether clamp also divides the loop into a primary loop and a secondary loop and is configured to maintain a size of the primary loop. The tether connector is slidably coupled to the primary loop and is configured to couple to the second restraint connector.

In a second aspect of the present invention, an animal restraint system includes a restraint and an arm clamp. The restraint has a first restraint connector and a second restraint connector. The arm clamp includes a clamp body, a tether, a tether clamp, and a tether connector. The clamp body is configured to affix to a securing arm and includes a tether anchor and a tether guide. The tether has a first tether end coupled to the tether anchor, a second tether end, and a middle section forming a loop having a first loop side extending from the first tether end and a second loop side extending from the second tether end through the tether guide. The tether anchor and the tether guide are positioned to maintain substantial alignment between the first loop side and the second loop side when the loop is tensioned. The tether clamp is slidably disposed over the first and second loop sides of the tether. The tether clamp also divides the loop into a primary loop and a secondary loop and is configured to maintain a size of the primary loop. The tether connector is slidably coupled to the primary loop and is configured to couple to the second restraint connector.

In a third aspect of the present invention, an arm clamp for an animal restraint system includes a clamp body, a tether, a tether clamp, and a tether connector. The clamp body is configured to affix to a securing arm and includes a tether anchor and a tether guide. The tether has a first tether end coupled to the tether anchor, a second tether end, and a middle section forming a loop having a first loop side extending from the first tether end and a second loop side extending from the second tether end through the tether guide. The tether anchor and the tether guide are positioned to maintain substantial alignment between the first loop side and the second loop side when the loop is tensioned. The tether clamp is slidably disposed over the first and second loop sides of the tether. The tether clamp also divides the loop into a primary loop and a secondary loop and is configured to maintain a size of the primary loop. The tether connector is slidably coupled to the primary loop.

Accordingly, an improved animal restraint system with an adjustable tether is disclosed. Advantages of the improvements will be apparent from the drawings and the description of the preferred embodiment.

BRIEF DESCRIPTION OF THE DRAWINGS

The foregoing summary, as well as the following detailed description of the exemplary embodiments, will be better understood when read in conjunction with the appended drawings. It should be understood, however, that the invention is not limited to the precise arrangements and instrumentalities shown in the following figures.

DETAILED DESCRIPTION OF THE INVENTION

Figure 1:
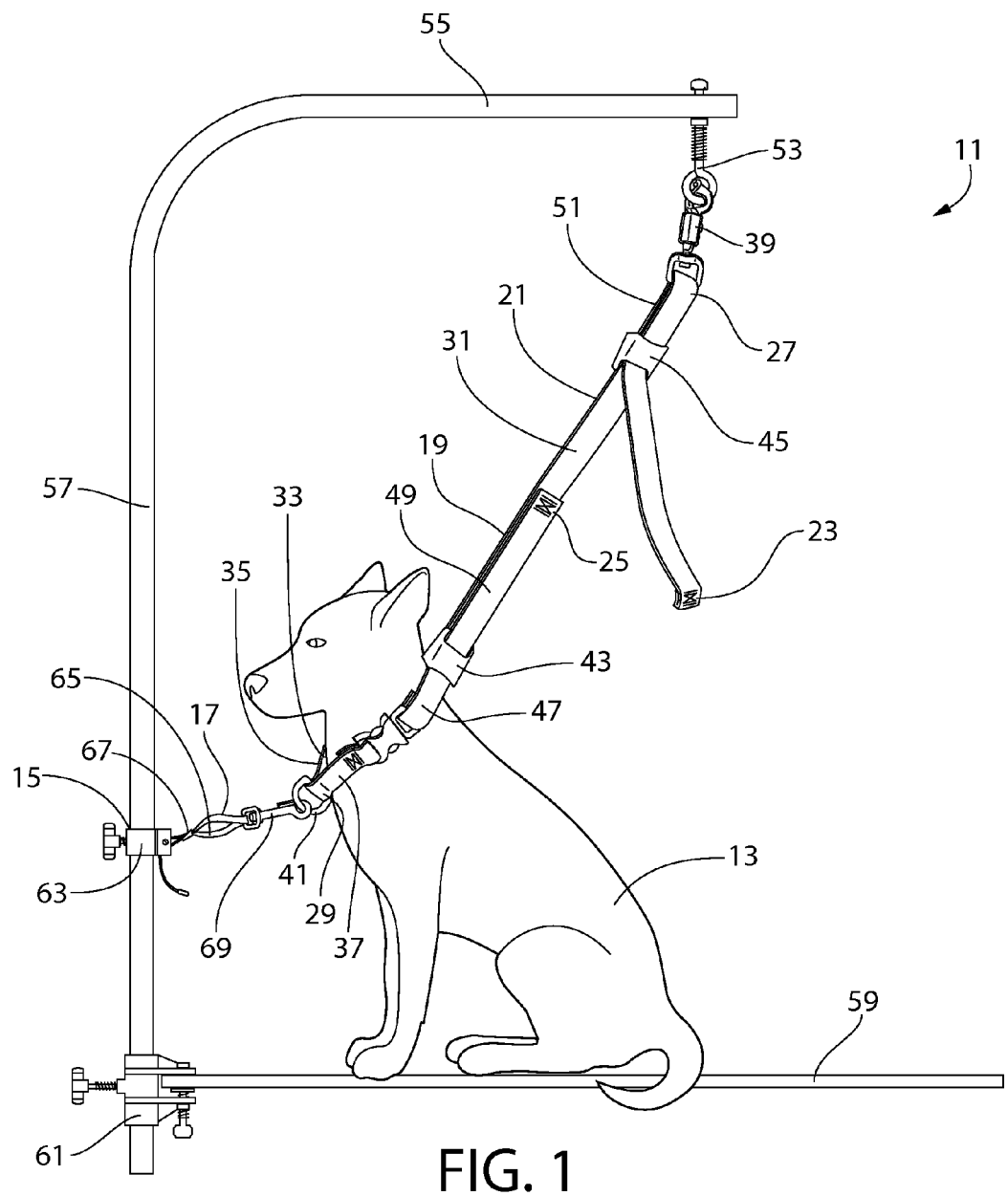
FIG. 1 illustrates an animal restraint system having an adjustable tether.

Turning in detail to the drawings, FIG. 1 shows a restraint system 11 for an animal 13, the restraint system 11 including an arm clamp 15 having an adjustable tether 17 coupled to a restraint 19. The restraint 19 includes a folded strap 21 having a first end 23, a second end 25, a first fold 27, and a second fold 29, with a middle portion 31 extending between the first fold 27 and the second fold 29. The first fold 27 and the second fold 29 are disposed between the first and second ends 23, 25 along the length of the strap 21. The second end 25 is affixed to the middle portion 31 of the strap to form a first loop 33 having first and second sides 35, 37 of substantially equal lengths. The second end 25 may be affixed to the middle portion 31 of the strap 21 with stitching, for example. The strap 21 may be made of material such as Nylon webbing, Polyester webbing, cotton webbing, cloth, or any other desired material appropriate for a particular usage.

The restraint 19 further includes a first connector 39 slidably disposed at the first fold 27, and a second connector 41 affixed at the second fold 29 by stitching the opposing sides of the strap about the second fold 29 so that the second connector 41 can not slide along the strap 21. Other techniques of affixing the second connector 41 to the second fold 29 may be used. In alternative embodiments, the first and/or second connector 39, 41 may be fixed or slidably disposed, as desired based on design considerations, in relation to the strap 21. As illustrated in FIG. 1, the first connector 39 is a panic snap closure mechanism (which are well-known in the art of animal restraints, with the swivel and load bearing structure being separated from the latching mechanism), and the second connector 41 is a D-ring. However, the first and/or second connector 39, 41 may also be any of a swivel snap closure mechanism, a ring, a grommeted hole, a panic snap closure mechanism or any other structure that allows a connection to be made. A connector with a swivel feature facilitates use of the restraint 19 by either a right-handed or left-handed groomer. Moreover, due to the swivel movement, the animal cannot twist the strap, thereby avoiding the strap tightening around its neck. The grommeted hole may be circular, square, triangular, D-shaped or of other convenient geometric shape, with the grommet being shaped to the hole and protecting it by engaging the front and rear sides of the strap around the perimeter of the hole.

The restraint 19 further includes a first strap clamp 43 and a second strap clamp 45. The first strap clamp 43 is slidably disposed over the first and second sides 35, 37 of the first loop 33. Thus, the first strap clamp 43 divides the first loop 33 into two loops, a primary restraint loop 47 and a secondary restraint loop 49. The primary restraint loop 47 is adapted to receive the neck of the animal 13. As the first strap clamp 43 is slidably disposed over the first and second sides 35, 37 of the first loop 33, the size of the primary restraint loop 47 may be adjusted so that the size of the primary restraint loop 47 is fitted to the size of an animal's neck. The second strap clamp 45 is slidably disposed over the first side and second side of the strap 21 around the first fold 27. Thus, the second strap clamp 45 forms a second loop 51 and an open side as the first end 23 is not affixed to another part of the strap 21. As the second strap clamp 45 is slidably disposed over the first and second sides of the strap around the first fold 27, the size of the second loop 51 may be adjusted so as to provide the desired length of a portion of the strap 21 between the second end 25 and the first connector 39. The adjustment of the size of the second loop 51 can be used to accommodate various heights of animals when the restraint is used with a system adapted to connect the first connector to an anchor point above the head of the animal, as is discussed in more detail below. As illustrated in FIG. 1, each of the first and second strap clamps 43, 45 is a cam snap. However, the first and/or second strap clamp 43, 45 may be any other structure that allows the size of the primary restraint loop 47 and the secondary restraint loop 49 respectively to he selectively fixed in place.

The first connector 39 is releasably connected to a first anchor point 53 on a first securing arm 55 and the second connector 41 is releasably connected to the arm clamp 15, which is affixed to a second securing arm 57. As shown, the first securing arm 55 is positioned and configured so that the first anchor point 53 is disposed. above the head of the animal 13, the second securing arm 57 is positioned and configured (in size and shape) so that the arm clamp 15 is disposed at, below, or above the head of the animal 13. While the first securing arm 55 and the second securing arm 57 are shown as an integral structure, with the first securing arm 55 being horizontal and the second securing arm 57 being vertical, the first and second securing arms may be distinct, separate pieces and they may be positioned in orientations different than the orientations shown. As shown, the first and second securing arms 55, 57 are affixed to the platform 59 by a platform clamp 61, which enables the first and second securing arms 55, 57 to be movable with respect to the platform 59. In particular, the platform clamp 61 enables the first and second securing arms 55, 57 to be moved in a vertical direction with respect to the platform 59, so that height of the first securing arm 55 with respect to the platform 59 is adjustable.

Figure 2A:
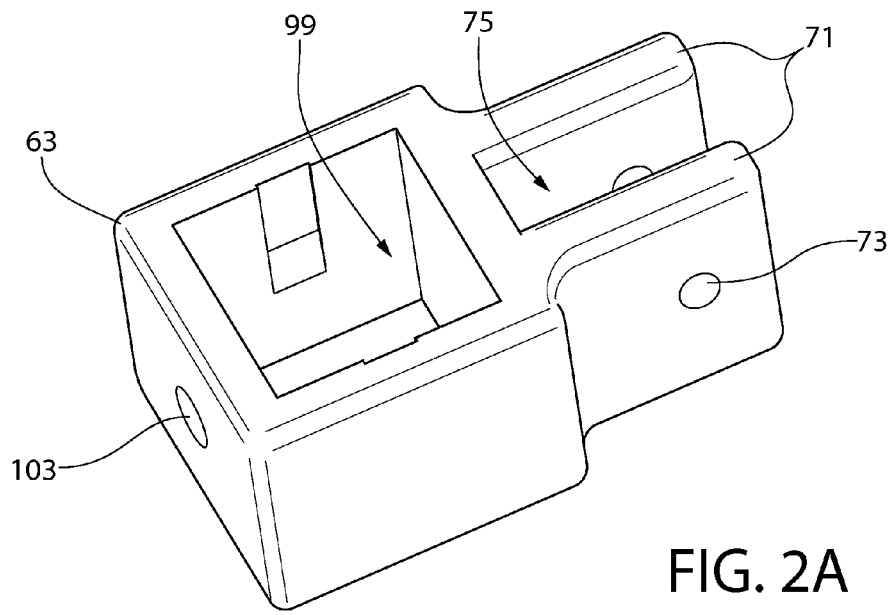
FIG. 2A is a perspective view of a first embodiment of an arm clamp body.
Figure 2B:
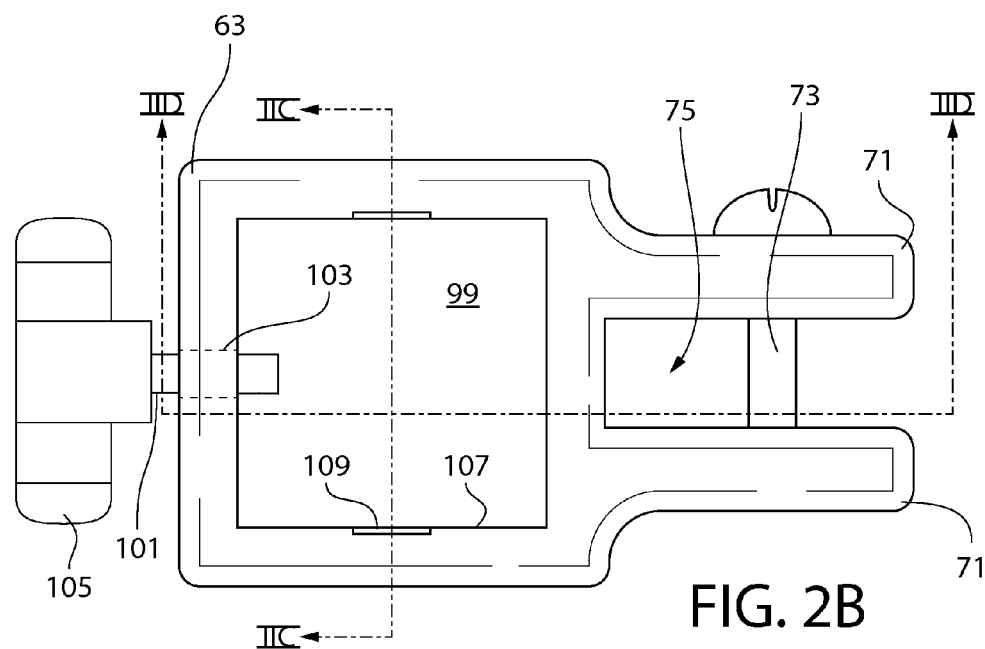
FIG. 2B is a top plan view of the arm clamp body of FIG. 2A.
Figure 2C:
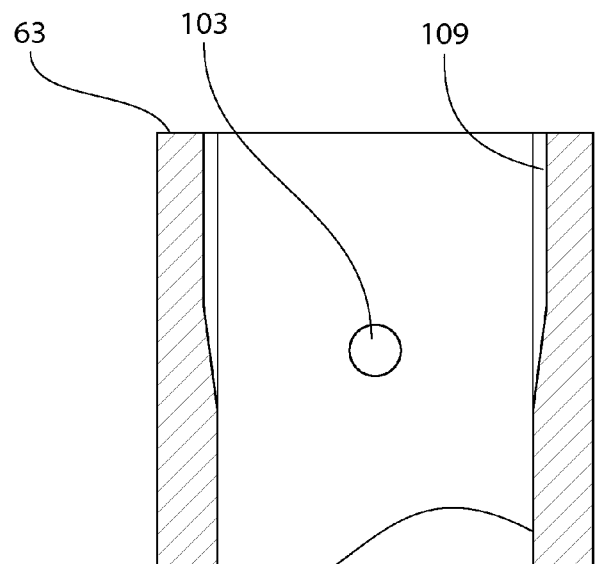
FIG. 2C is a sectional view of the arm clamp body along the line IIC-IIC of FIG. 2B.
Figure 2D:
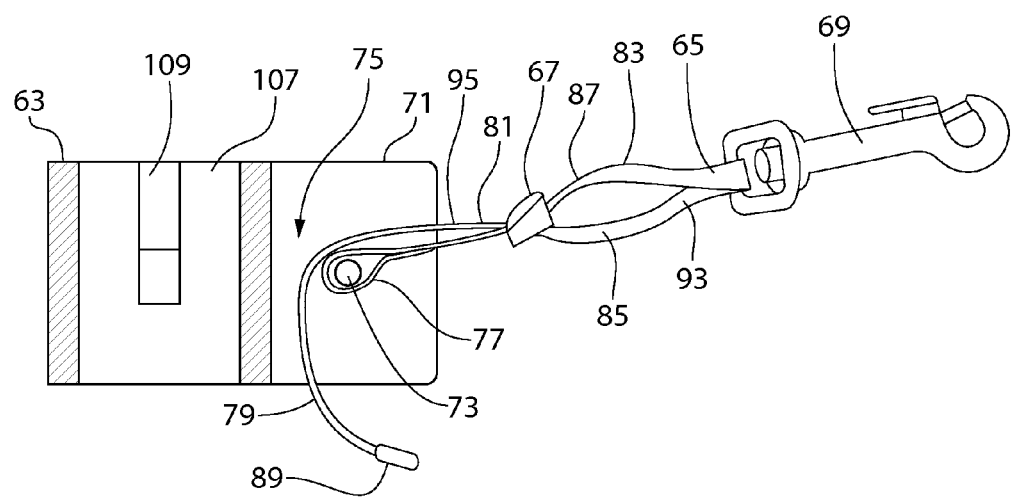
FIG. 2D is a sectional view of the arm clamp body along the line IID-IID of FIG. 2B.

The arm clamp 15 includes a clamp body 63, a tether 65, a tether clamp 67, and a tether connector 69. Referring to FIGS. 1, 2A, and 2B, the clamp body 63 includes two outward-extending arms 71, which are spaced apart from one another, and a tether anchor 73 coupled between the two arms 71. A tether guide 75 is formed as an aperture bordered on each of three sides respectively by the two arms 71 and the tether anchor 73. The tether guide 75 may be bordered on the fourth side by a portion of the clamp body 63 or by the securing arm to which the clamp body 63 is affixed.

The tether 65 includes a first tether end 77 coupled to the tether anchor 73 and a second tether end 79 which extends through the tether guide 75. The middle portion 81 of the tether 65 forms a tether loop 83 having a first loop side 85 extending from the first tether end 77 and a second loop side 87 extending from the second tether end 79 through the tether guide 75. The second tether end 79 includes a stopper 89, which may be a knot formed at the second tether end 79 or a metal or plastic end cap attached to the second tether end 79. The stopper 89 has at least one cross-sectional dimension that is larger than a cross-sectional dimension of the aperture forming the tether guide 75 so that the second tether end 79 does not pass through the tether guide 75. The stopper 89 may also be shaped so that as it is drawn between the two outward-extending arms 71, the stopper 89 is forced to rotate by the two outward-extending arms 71 so that the cross-sectional dimension of the stopper 89 that is larger is aligned with a smaller cross-sectional dimension of the aperture forming the tether guide 75, thereby preventing the stopper 89 from passing through the aperture. With such a configuration, the second tether end 79 remains in position for the user to pull when desired. Like the restraint 19, the tether 63 may made of material such as Nylon webbing, Polyester webbing, cotton webbing, cloth, or any other desired material appropriate for a particular usage.

The tether clamp 67 is slidably disposed over the first and second loop sides 85, 87, dividing the tether loop 83 into a primary tether loop 93 and a secondary tether loop 95, with the tether clamp 67 maintaining the size of the primary tether loop 93. The tether connector 69 is slidably coupled to the primary tether loop 93 for coupling the tether 65 to the second connector 41 of the restraint 19. The tether connector 69 and the second connector 41 may be any complementary connectors capable of being connected to each other.

The relative positions of the tether anchor 73 and the tether guide 75 maintain substantial alignment between the first loop side 85 and the second loop side 87 when the loop 83 is tensioned, and the enlarged stopper at the second tether end 79 helps ensure that this substantial alignment configuration is maintained during use of the arm clamp 15. The loop 83 is tensioned when at least one of the first or second loop sides 85, 87 is tensioned, and generally only the first loop side 85 will he tensioned when an animal is placed within the restraint 19. By having substantial alignment between the first loop side 85 and the second loop side 87 when the loop 63 is tensioned, a groomer may pull on and tension the second tether end 79, drawing the second loop side 87 over the first tether end 77 and the tether anchor 73, so that the size of the primary tether loop 93 is decreased. Closure of the tether clamp 67 will maintain the reduced size of the primary tether loop 93, thereby better securing the animal 13 for grooming by increasing tension in the restraint 19.

The clamp body 63 forms an arm aperture 99 which is configured in size and shape to receive one of the securing arms. A threaded rod 101 threadably engages a threaded through hole 103 in the clamp body 63 to enable the clamp body to be secured in place on a securing arm. A handle 105 is affixed to the end of the threaded rod 101 so that the threaded rod 101 may be rotated by hand. In certain embodiments, the clamp body 63 may be configured to extend only partially around a securing arm, while still effectively forming an arm aperture and having a threaded rod engaging the clamp body to secure the clamp body 63 to a securing arm.

Figure 3A:
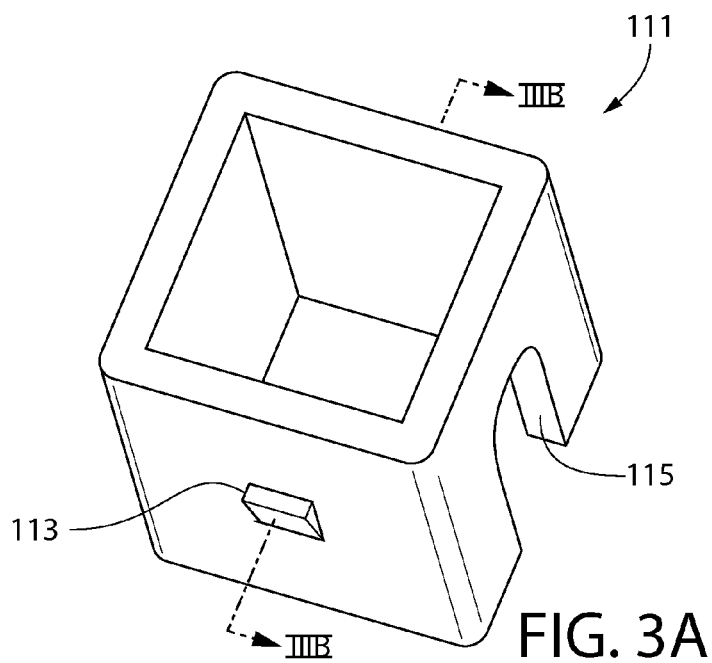
FIG. 3A is a perspective view of an arm clamp spacer.
Figure 3B:
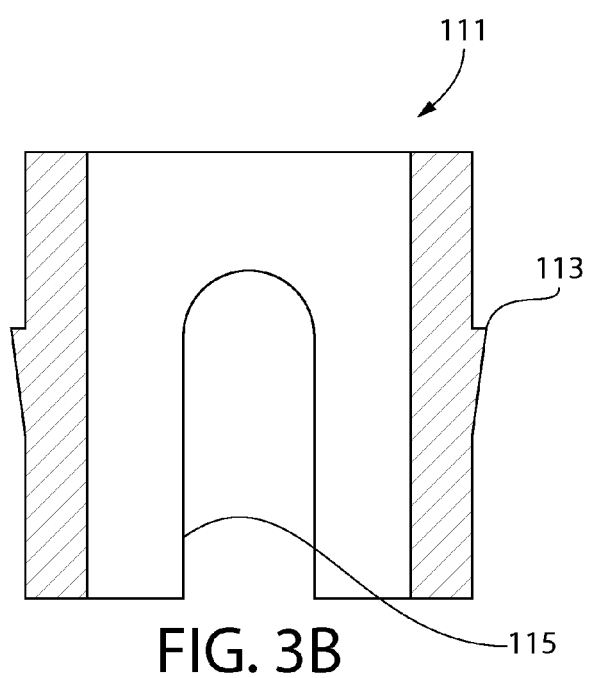
FIG. 3B is a sectional view of the arm clamp spacer along the line III-IIIB of FIG. 3A.

As shown in FIGS. 2A-D, the interior walls 107 of the clamp body 63 bordering the arm aperture 99 may also include locking indentations 109. As shown in FIGS. 3A-B, a clamp spacer 111 includes locking protuberances 113 formed on an external surface, and the locking protuberances 113 are complementary in form and shape to the locking indentations 109 on the clamp body 63. The clamp spacer 111 has a size and shape to fit within the arm aperture 99 of the clamp body 63 to effectively reduce the size of the arm aperture 99. When the clamp spacer 111 is seated within the arm aperture 99, the locking protuberances 113 of the clamp spacer 111 engage the locking indentations 109 of the clamp body 63 so that the clamp spacer 111 forms a snap-fit with the clamp body 63. The locking engagement between the clamp spacer 111 and the clamp body 63 may be disengaged by appropriate forces exerted in opposite directions on each of the clamp spacer 111 and the clamp body 63. Like the clamp body 63, the clamp spacer 111 may be configured to extend only partially around a securing arm. In addition, the clamp spacer 111 may be configured to effectively alter the shape profile of the arm aperture 99, so that the clamp body 63 may be placed on a securing arm that has a different shape profile as compared to the shape profile of the arm aperture 99 of the clamp body 63.

The clamp spacer 111 also includes a slotted opening 115 in one wall that is positionable in alignment with the threaded through hole 103 in the clamp body 63. This slotted opening 115 allows the threaded rod 101 to engage a securing arm, as opposed to engaging the clamp spacer 111 when the clamp spacer 111 is seated within the clamp body 63. In alternative embodiments, the slotted opening may extend from the top to the bottom of the spacer, it may be a through hole that aligns with the threaded through hole 103 of the clamp body 63, or it may be omitted entirely.

Figure 4A:
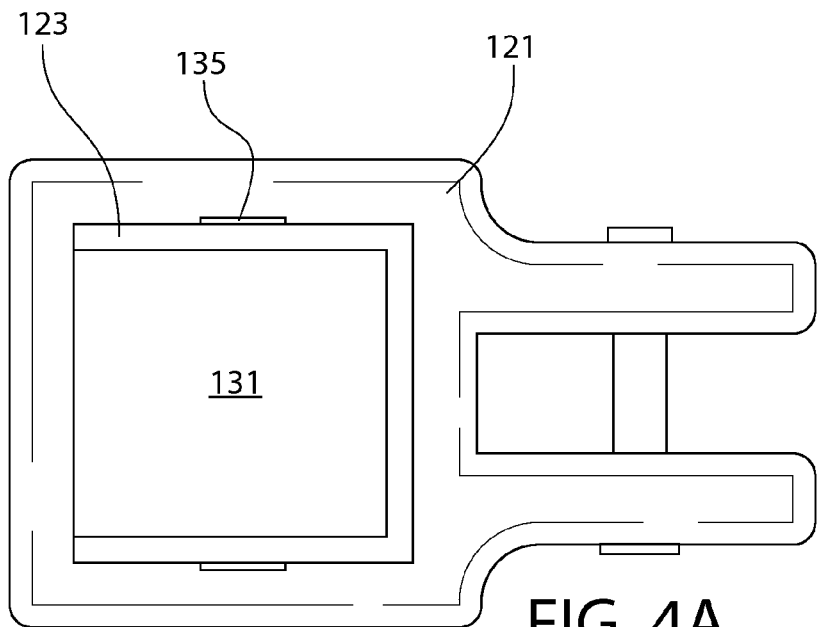
FIG. 4A is a perspective view of second embodiments of an arm clamp body and an arm clamp spacer.
Figure 4B:
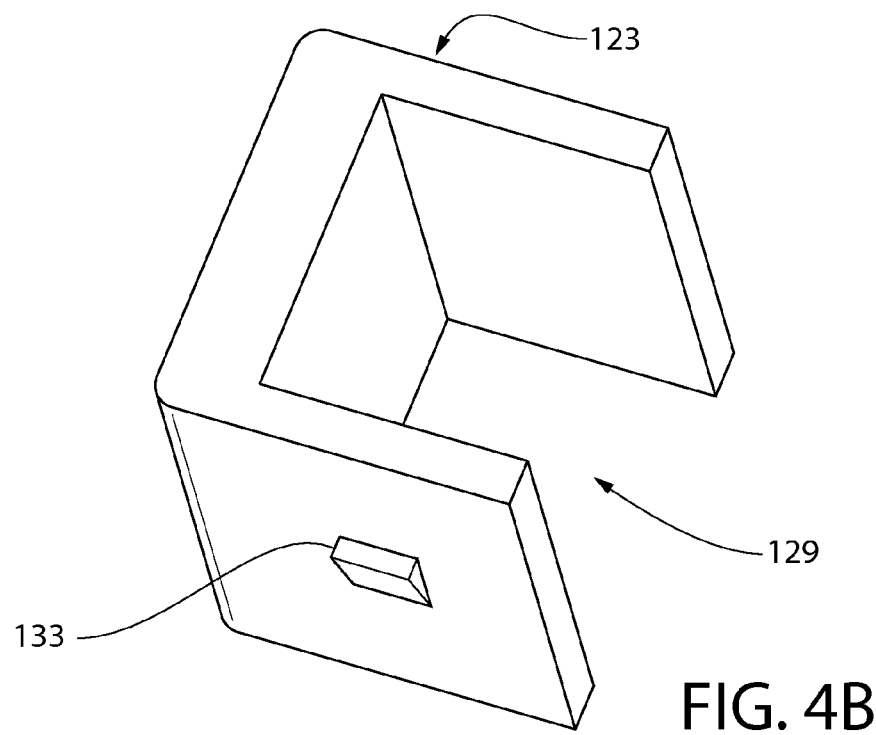
FIG. 4B is a perspective view of the arm clamp spacer of FIG. 4A.

FIGS. 4A and 4B illustrate a clamp body 121 in combination with a second embodiment of a clamp spacer 123, with the clamp body 121 being the same as shown and described for FIGS. 2A-D, The clamp spacer 123 is U-shaped having an open middle space 129 which has a size and shape to fit within the arm aperture 131 of the clamp body 121 to effectively reduce the size of the arm aperture 131. The clamp spacer 123 also includes locking protuberances 133 formed on an external surface, and the locking protuberances 133 are complementary in form and shape to the locking indentations 135 on the clamp body 121. The locking protuberances 133 of the clamp spacer 123 engage the locking indentations 135 of the clamp body 121 so that the clamp spacer 123 forms a snap-fit with the clamp body 121. The locking engagement between the clamp spacer 123 and the clamp body 121 may be disengaged by appropriate forces exerted in opposite directions on each of the clamp spacer 123 and the clamp body 121. In other embodiments, the clamp spacer 123 may have fewer than the three sides of the U-shaped clamp spacer shown.

Figure 5:
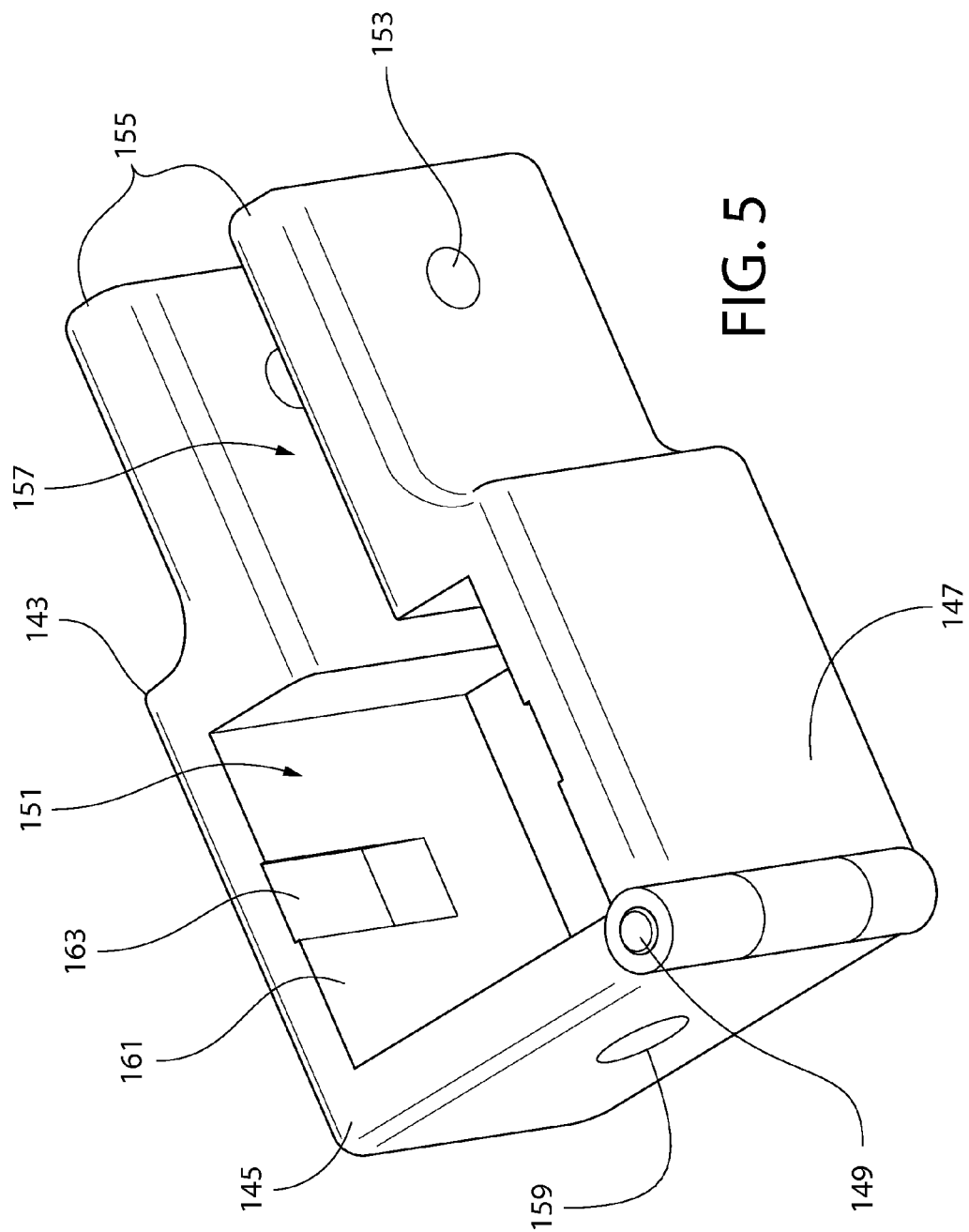
FIG. 5 is a perspective view of a third embodiment of an arm clamp body.

Another embodiment of a clamp body 143 for arm clamp is shown in FIG. 5. This clamp body 143 is formed from two body portions 145, 147 which are connected by a hinge joint 149. The two body portions 145, 147 pivot about the hinge joint 149 between an open position and a closed position. When the two body portions 145, 147 are in the open position, the clamp body 143 may be placed on a securing arm. When the two body portions 145, 147 are in the closed position, together they form an arm aperture 151 which is configured with an appropriate size and shape to secure the clamp body 143 to a securing arm. The tether anchor 153 extends between and is coupled to the two outward-extending arms 155 when the two body portions 145, 147 are w the closed position. The tether anchor 153 is removably coupled to at least one of the two outward-extending arms 155 so that the two body portions 145, 147 may transition from the closed position to the open position. The tether (not shown) may be coupled to the tether anchor 153 when the two body portions 145, 147 are in the open position, so that when the two body portions 145, 147 are transitioned to the closed position, the tether is coupled to the tether anchor 153 and the second end of the tether extends through the tether guide 157 bounded by the tether anchor 153 and the two outward-extending arms 155 when the two body portions 145, 147 are in the closed position.

The clamp body 143 includes a threaded through hole 159 to be used with a threaded rod to affix the clamp body 143 to a securing arm. The interior walls 161 of the clamp body 143 bordering the arm aperture 151 may also include locking indentations 163 so that a clamp spacer may be fit within the arm aperture 151. With the hinged configuration of the clamp body 143, the clamp spacer need not couple to the clamp body 143 by a snap-fit, but instead may be first placed on the securing arm, and then the clamp body 143 is placed over the clamp spacer, with the locking indentations 163 of the clamp body 143 engaging complementary looking protuberances formed on an external surface of the clamp spacer to thereby retain the clamp spacer in position within the arm aperture 151.

The restraint system described herein allows a handler to control an animal more easily and allows the handler to quickly and efficiently adjust the system to any size animal. The animal has only a small area in which it can move while at the same not being encumbered with uncomfortable pressure upon its throat. This enables the handler to safely work on all parts of the animal's anatomy without substantial danger of being bitten or losing control over the animal.

Thus, an animal restraint system with an adjustable tether is disclosed. While exemplified embodiments of this invention have been shown and described, it will be apparent to those skilled in the art that many more modifications are possible without departing from the inventive concepts expressed herein. The invention, therefore, should be construed broadly in accordance the following claims, and the scope of the invention should not be restricted unless explicitly expressed in the claims.

What is claimed is:

1. An animal restraint system comprising:
    a first securing arm;
    a second securing arm;
    a restraint having a first restraint connector and a second restraint connector, wherein the first securing arm is configured to couple to the first restraint connector above an animal's head; and
    an arm clamp comprising:
        a clamp body configured to affix to the second securing arm at or below the animal's head, the clamp body including a tether anchor and a tether guide, wherein the clamp body comprises two arms extending outward and spaced apart from one another, with the tether anchor coupled between the two arms;
        a tether having a first tether end coupled to the tether anchor, a second tether end, and a middle section forming a loop having a first loop side extending from the first tether end and a second loop side extending from the second tether end through the tether guide, wherein the tether anchor and the tether guide are positioned to maintain substantial alignment between the first loop side and the second loop side when the loop is tensioned;
        a tether clamp slidably disposed over the first and second loop sides, wherein the tether clamp divides the loop into a primary loop and a secondary loop and is configured to maintain a size of the primary loop; and
        a tether connector slidably coupled to the primary loop and configured to couple to the second restraint connector.

2. The animal restraint system of claim 1, wherein the tether guide comprises an aperture bordered on three sides by the two arms and the tether anchor.

3. The animal restraint system of claim 1, wherein the second tether end comprises a stopper having at least one cross-sectional dimension that is larger than a cross-sectional dimension of the aperture.

4. The animal restraint system of claim 1, wherein the clamp body comprises a main body forming an arm aperture configured so that the main body is positionable at least partially around the second securing arm.

5. The animal restraint system of claim 4, wherein the clamp comprises a clamp spacer configured to be positioned within the arm aperture of the main body and at least partially around the second securing arm.

6. The animal restraint system of claim 5, wherein the clamp spacer is configured to form a snap-fit with the main body.

7. An animal restraint system comprising:
    a restraint having a first restraint connector and a second restraint connector; and
    an arm clamp comprising:
        a clamp body configured to affix to a securing arm, the clamp body including a tether anchor and a tether guide, wherein the clamp body comprises two arms extending outward and spaced apart from one another, with the tether anchor coupled between the two arms;
        a tether having a first tether end coupled to the tether anchor, a second tether end, and a middle section forming a loop having a first loop side extending from the first tether end and a second loop side extending from the second tether end through the tether guide, wherein the tether anchor and the tether guide are positioned to maintain substantial alignment between the first loop side and the second loop side when the loop is tensioned;
        a tether clamp slidably disposed over the first and second loop sides, wherein the tether clamp divides the loop into a primary loop and a secondary loop and is configured to maintain a size of the primary loop; and a tether connector slidably coupled to the primary loop and configured to couple to the second restraint connector.

8. The animal restraint system of claim 7, wherein the tether guide comprises an aperture bordered on three sides by the two arms and the tether anchor.

9. The animal restraint system of claim 7, wherein the second tether end comprises a stopper having at least one cross-sectional dimension that is larger than a cross-sectional dimension of the aperture.

10. The animal restraint system of claim 7, wherein the clamp body comprises a main body forming an arm aperture configured so that the main body is positionable at least partially around the securing arm.

11. The animal restraint system of claim 10, wherein the arm clamp comprises a clamp spacer configured to be positioned within the arm aperture of the main body and at least partially around the securing arm.

12. The animal restraint system of claim 11, wherein the clamp spacer is configured to form a snap-fit with the main body.

* * * * *